United States Patent
Foth

(10) Patent No.: US 6,840,853 B2
(45) Date of Patent: Jan. 11, 2005

(54) DISTRIBUTING DEVICE HAVING CONTINUOUSLY MOVING GUIDE VANES

(75) Inventor: Christoph Foth, Ballin (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/881,172

(22) Filed: Jun. 14, 2001

(65) Prior Publication Data

US 2002/0072400 A1 Jun. 13, 2002

(30) Foreign Application Priority Data

Jun. 16, 2000 (DE) .......................................... 100 29 715

(51) Int. Cl.[7] ............................ A01F 12/30; A01F 12/40
(52) U.S. Cl. ...................................... 460/111; 460/112
(58) Field of Search ................................. 241/187–190, 241/240–241, 243; 239/650; 460/112, 1, 901, 111, 113, 10; 56/10.2 R, 500, 504, 505

(56) References Cited

U.S. PATENT DOCUMENTS

| | | | | |
|---|---|---|---|---|
| 2,670,775 A | * | 3/1954 | Elofson | 241/187 |
| 2,708,582 A | * | 5/1955 | Adams | 239/650 |
| 2,865,416 A | * | 12/1958 | Hetteen | 241/238 |
| 3,005,637 A | * | 10/1961 | Hetteen | 241/240 |
| 3,350,017 A | * | 10/1967 | Howell et al. | 239/660 |
| 4,218,022 A | * | 8/1980 | Boehm et al. | 241/101.75 |
| 4,532,941 A | * | 8/1985 | Gauthier | 460/112 |
| 4,637,406 A | * | 1/1987 | Guinn et al. | 460/112 |
| 4,646,757 A | * | 3/1987 | Schmitt et al. | 460/112 |
| 4,921,469 A | * | 5/1990 | Scharf | 460/10 |
| 5,021,028 A | * | 6/1991 | Kersting et al. | 460/85 |
| 5,120,275 A | * | 6/1992 | Zacharias | 460/111 |
| 5,569,081 A | * | 10/1996 | Baumgarten et al. | 460/112 |
| 5,797,793 A | * | 8/1998 | Matousek et al. | 460/111 |

FOREIGN PATENT DOCUMENTS

| | | | |
|---|---|---|---|
| DE | 80 14 119 | 10/1980 | |
| DE | 38 38 936 | 5/1989 | |
| DE | 41 34 136 A1 | 4/1993 | |
| DE | 0 685 151 A | 7/1999 | |
| DE | 0 993 764 | 4/2000 | |
| EP | 537621 A2 * | 4/1993 | ............ A01D/43/08 |

* cited by examiner

Primary Examiner—Árpád Fab Kovács

(57) ABSTRACT

The invention is directed to a distributing device for a straw chopper arrangement. The chopper arrangement is provided with at least one guide vane for the transversely scattering the chopped straw. The position of the guide vane can be varied by a drive. In order to attain a uniform distribution of the chopped straw on the field the drive continuously moves the guide vane back and forth.

16 Claims, 3 Drawing Sheets

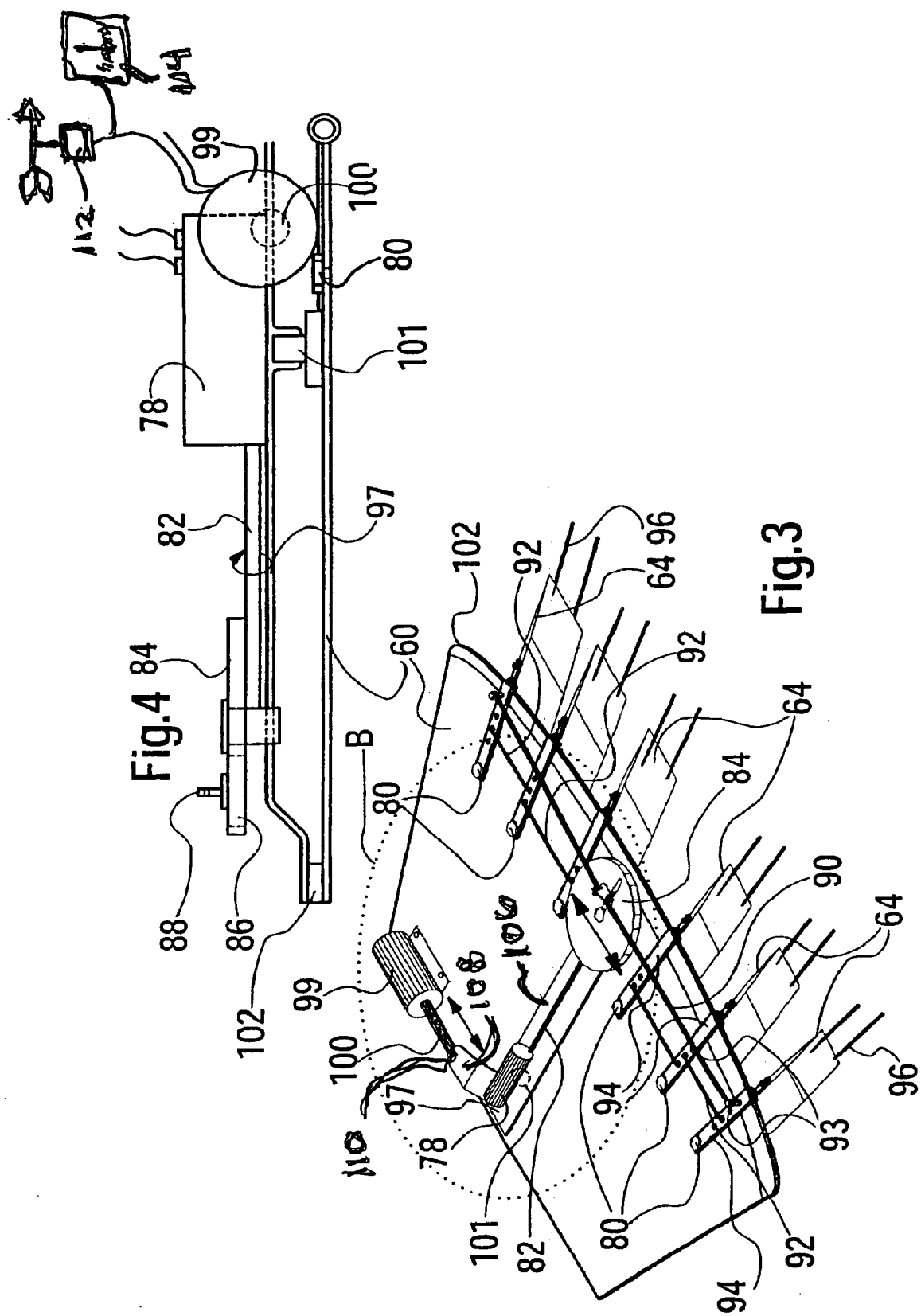

DISTRIBUTING DEVICE HAVING CONTINUOUSLY MOVING GUIDE VANES

FIELD OF THE INVENTION

The present invention is directed to a distributing device for a chopper arrangement having at least one guide vane for the transverse scattering of the chopped straw, wherein the position of the guide vane, is varied back and forth by a drive.

BACKGROUND OF THE INVENTION

Distributing devices with curved guide vanes are used to transversely deflect the remains of crop (straw) ejected by a chopper attached to the rear of a combine. The curvature of the guide vanes controls the transverse width of the distribution of the chopped straw so that it covers the transverse width of the cut crop. Under normal, dry conditions after leaving the guide vanes the chopped straw is braked by the air resistance and swirled about to a limited degree. As such, the straw is deposited on the ground in a uniform layer. With very moist crop or green crop and heavy straw, the air resistance cannot swirl the chopped straw as strongly. The straw leaves the guide vanes in the form of rays and is thrown to the ground in bundles. Thereby clearly visible swaths appear behind the combine that can be associated with the individual guide vanes.

EP 0 685 151 A describes a distributing arrangement for choppers that is provided with several guide vanes arranged in a deflector housing that can be repositioned by a motor in order to direct the chopped crop. The direction of the guide vanes is adjusted automatically by the motor to correspond to a wind direction and speed detected by a sensor, in order to distribute the chopped straw uniformly over the width of cut of the combine.

In DE 41 34 136 A it is proposed that the guide vanes of a distributing arrangement be pivoted as a function of the inclination of the field on which the combine is operating.

However, these known repositioning arrangements for the guide vanes cannot solve the problem of the formation of swaths with moist crop.

SUMMARY

It is an object of the present invention to make a distributing device that uniformly distributes the remains of chopped straw on the ground.

The basic idea comprises continuously changing the position of the guide vanes by a motorized drive. In this way the remains of the crop are deflected successively to constantly changing directions so that with sufficiently high velocity of the repositioning of the guide vanes a uniform distribution of the remains of the crop on the field can be attained even with moist or green straw. Due to the improved distribution, the number of guide vanes can be reduced whereby the danger of jamming is diminished and the flow of material is improved. The invention can also be retrofitted to existing distributing devices.

Preferably the drive pivots the guide vane back and forth about a vertical axis, so that the direction, into which the remains of the crop are deflected, changes continuously. It would also be possible to clamp the guide vanes rigidly at their upstream ends and to bend them back and forth with the drive in varying directions. A pivot bearing would be eliminated, but the energy for the pivoting motion would be increased. Sliding the guide vanes in the sideways direction is also conceivable.

One solution is to arrange several guide vanes to the side alongside each other and to connect them with the drive. The guide vanes may all be driven uniformly in a single phase, or they may be subdivided into two (or more) groups that are moved in opposite phases (or in different phases).

If a drive producing a rotational movement is used, a conversion of the rotational movement of the drive into the pivoting movement or the linear movement of the guide vanes is required in order to generate the back and forth movement of the guide vanes. But it is also conceivable that a linear motor be applied, for example, an electrically driven linear actuator, or a double-acting hydraulic motor, or a single acting hydraulic cylinder operating against the force of a spring.

The conversion of a rotary movement into a linear movement can be performed by an element brought into rotation by the drive that engages a connecting rod. As an alternative, it would also be possible to drive an eccentric by means of the drive which slides another element, that element being connected with the guide vanes.

The rotating element can be provided with a hole that engages a pin, which is connected with the connecting rod. The pin is preferably arranged in an elongated hole in the element, so that a continuous adjustment of the amplitude of the pivoting movement can be performed by a variation in the position of the pin in the elongated hole. It would be conceivable to provide several holes in the element spaced at varying distances from the axis of rotation, into which the pin can be selectively inserted, instead of the elongated hole. Thereby a rotation of the pin in the holes about a connection, fixed against rotation, between the pin and the connecting rod is possible. On the other hand, in the case of an elongated hole the pin is fastened, as a rule, fixed against rotation, relative to the element, and the connecting rod rotates with respect to the drive.

Each guide vane can be connected separately with the drive. However, it is preferred that several elements be connected so as to be driven together by a strut, and to put the strut into a reciprocating back and forth movement by the drive. The guide vanes can preferably be fastened in differing positions on the strut, so that their operating angles can be selected. For the fastening of the guide vanes to the strut, so that they can be removed or repositioned, connecting elements can be used that are located on the upper side of the housing of the distributing device, so as to relieve the load on the pivot bearings of the guide vanes.

It is proposed that the guide vanes be equipped with a diffusor, particularly in their end regions, that produces an improvement of the distributing effect. Such diffusors can be produced by steel wire bristles, sheet metal vanes or recesses in the guide vanes.

Furthermore the angular region covered by the guide vanes can be varied as a function of the wind direction and/or the inclination of the ground. For this purpose an additional drive can be provided that is controlled by a sensor or manually, and that varies the position of a drive of the guide vanes. It would also be conceivable that only a single motor be provided for the pivoting of the guide vanes that generates a back and forth motion, whose range of motion is controlled as a function of the wind direction and/or the inclination of the ground.

BRIEF DESCRIPTION OF THE DRAWINGS

FIG. 3 shows a top rear perspective plan view of a second embodiment of the distributing device.

FIG. 4 shows an enlarged side view of the region B circled in FIG. 3.

DETAILED DESCRIPTION

Figure 1:
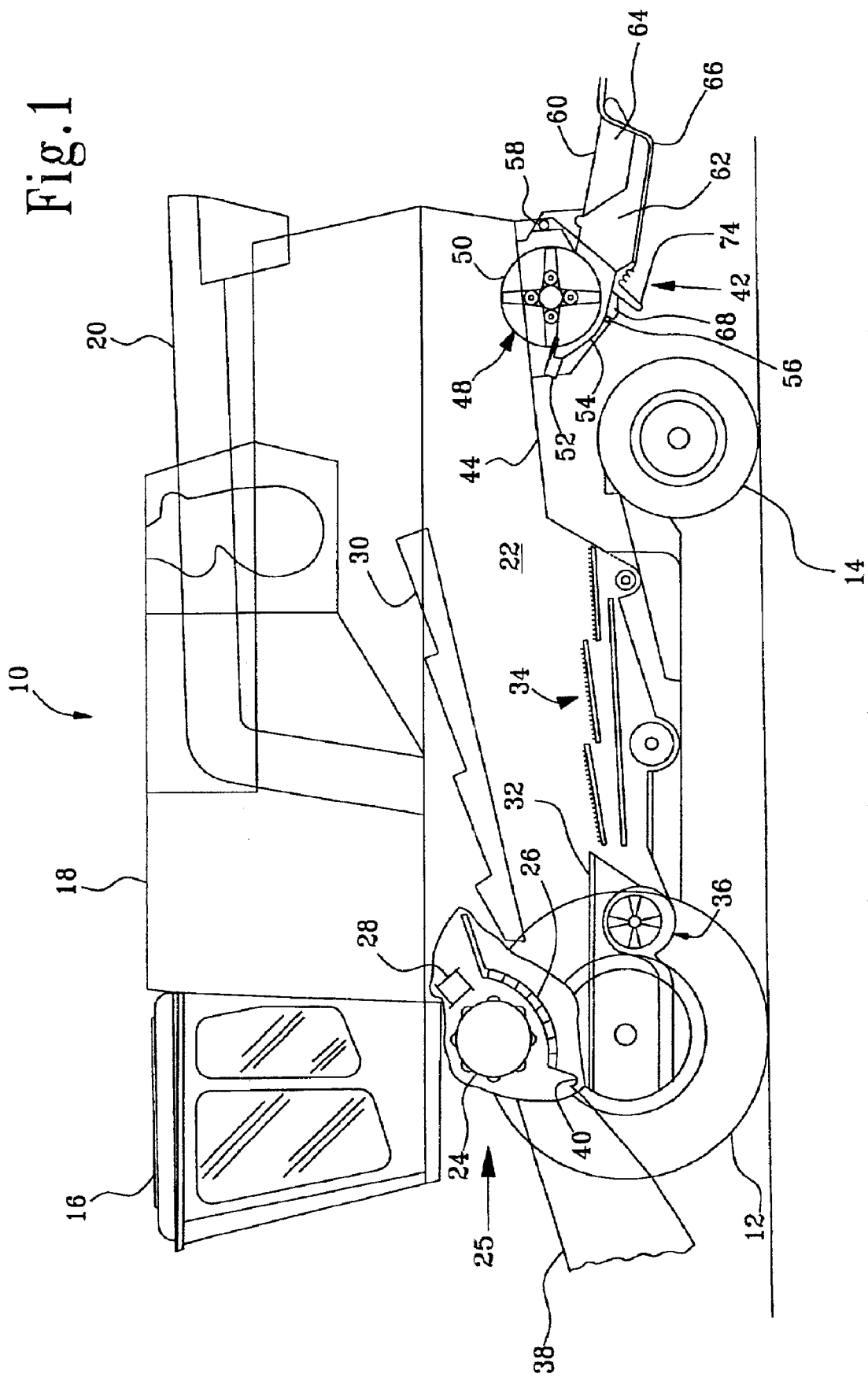
FIG. 1 is a semi-schematic side view of a combine having a straw chopper that is provided with a distributing device of the present invention.

A harvesting machine 10, in the form of a combine, is carried on front driven wheels and rear steerable wheels 12 and 14. The combine is provided with an operator's cab 16 from which the combine is controlled. A grain tank 18 is located behind the operator's cab 16. The grain tank 18 is provided with a discharge auger 20. The grain tank 18 is supported on a frame 22 formed by the combine side sheets. A harvested crop is first cut by a harvesting platform, not shown, that directs the harvested crop to a feeder house 38. The feeder house 38 is an inclined conveyor and directs the harvested crop past a stone trap 40 to a threshing assembly 25 located between the side sheets. The threshing assembly 25 comprises a rotating threshing cylinder 24, a concave 26 and a rotating beater 28. The threshing assembly 25 separates the harvested crop into its large (straw) and small (grain and chaff) components. The large components and small components trapped therein pass over the concave 26 and are directed to straw walkers 30 located behind the threshing assembly 25. The straw walkers 30 act as a separator assembly by releasing the trapped small components from the large components. Small components fall from the concave 26 and straw walkers 30 onto grain pan 32. From the grain pan 32 the small components are directed to sieves 34 past an air blast created by cleaning fan 36. Clean grain falls from the sieves 34 to the floor of the combine where it is collected and directed to grain tank 18. The lighter chaff is blown out the rear of the combine by cleaning fan 36. The large crop components are conveyed over the straw walkers 30 into an exhaust hood 44. In place of the straw walkers 30 one or several rotating separator drums may be provided.

A chopper arrangement 42 is located at the rear of the exhaust hood 44. The large components of the harvested crop, herein designated as straw, are grasped by a rapidly rotating drum 48 that rotates in a counterclockwise direction. Several movable knives 50 are distributed uniformly around the circumference of the drum 48. The straw is carried along by the drum 48 and the knives 50 and drawn past a stationary rail having shear bars 52.

The housing of the chopper arrangement 42 is fastened to the underside of the exhaust hood 44 and encloses the drum 48. The first region 54 of the housing is stationary and attached to the frame 22 of harvesting machine 10. A second region 68 of the housing is located behind the first region 54. The straw is conducted by the drum 48 past the second region 68. The second region 68 is pivotally connected to the first region 54 about a first axis 56 that is orthogonal to the plane of the drawing.

The outlet end of the chopper arrangement 42 is provided with a distributing device 62 for transversely scattering chopped straw. The distributing device 62 is provided with a top plate 60 that can be pivoted about a second axis 58 extending perpendicular to the plane of the drawing. In this way the inclination of the entire distributing device 62 can be adjusted relative to the ground. A number of guide vanes 64 are arranged underneath the top plate 60. The guide vanes 64 are oblong sheet metal vanes extending downward perpendicular to the top plate 60, that are provided with a curvature directed to the right or the left with respect to the direction of operation of the harvesting machine 10. The distributing device 62 can be provided with a housing, not shown, that is closed at the top, the bottom and at the provided with a housing, not shown, that is closed at the top, the bottom and at the sides, in order not to dissipate too rapidly the energy of the air flow generated by the drum 48.

Levers 74 are attached to one side (or both sides) of the bottom of the second region 68. Several recesses are provided on the bottom of the second region 68 behind the levers 74. In each case, one of these recesses engages a transverse rod that is connected over a rod 66 with the top plate of the distributing device 62. The selection of the recess in each case brought into engagement with the transverse rod establishes the inclination of the distributing device 62. Simultaneously, the inclination of the second region 68 of the housing and thereby the horizontal direction of ejection of the chopped straw is made to conform to the inclination of the distributing device 62.

Figure 2:
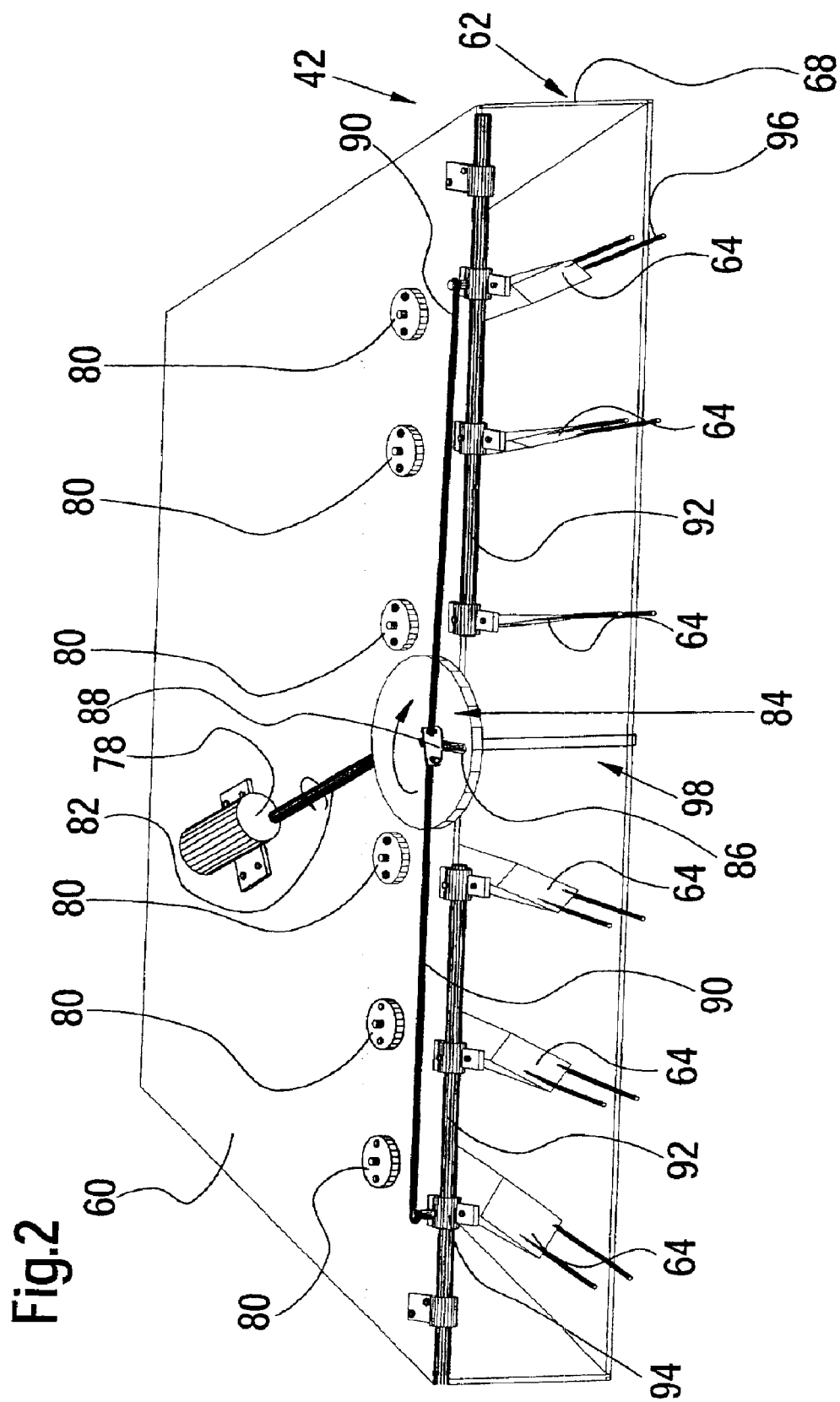
FIG. 2 shows a rear perspective view of the distributing device.

In order to attain a uniform distribution of the chopped straw, the guide vanes 64 are continuously pivoted back and forth in a sideways direction by a drive 78 (see FIG. 2). The guide vanes 64 are pivotally attached at their upstream ends to the top plate 60 at vertical axes 80. The axes 80 can be selectively offset in the direction of operation to the front and to the rear, since differing points are provided for the attachment of the guide vanes 64 to the top plate 60. Approximately at one-half its length a clamp-shaped connecting element 94 is provided on the upper side of each guide vane 64. Connecting elements 94 connect the guide vanes 64 with struts 92. The connecting elements 94 are slidably mounted on the upper side of the top plate 60, in order to reduce the load on the pivot bearings of the guide vanes 64 on the axes 80. A strut 92 is arranged on both sides of a vertical center wall 98 which divides the housing of the distributing device 62 into two (left and right) halves, connecting the guide vanes 64 associated with each of the halves of the distributing device 62 with each other.

The outer two guide vanes 64 are connected to two outer connecting elements 94. Each of these outer connecting elements 94 is fastened to a connecting rod 90. The other ends the connecting rods 90 are supported in bearings on a pin 88, for example, by a ring supported in a ball joint enclosing the pin 88. The pin 88 is located in an elongated hole 86 in a rotatable disk-shaped element 84. The rotatable element 84 is rotated by an angular gearbox, not shown, that is driven by a drive 78 through a shaft 82.

The drive 78 is an electric or hydraulic motor wherein the rotational velocity of the motor can be adjusted. The drive 78 rotates element 84 through the shaft 82 and the angular gearbox, so that the pin 88 also rotates about the axis of rotation of the element 84. The connecting rods 90, that are coupled to the pin 88, are thereby continuously pulled back and forth, so that the connecting elements 94 of the outer guide vanes 64 and also the struts 92 continuously move from left to right and vice versa. As a result the guide vanes 64 are continuously pivoted back and forth about the axes 80.

The guide vanes 64 are provided with a curvature illustrated in FIG. 2. The chopped straw is conducted in a curved path corresponding to the curvature. The chopped straw leaves the guide vanes in the tangential direction and is thrown onto the field deflected to the side relative to the direction of operation of the harvesting machine 10. Diffusors 96 attached to the ends of the guide vanes 64 in the form of steel wire rods improve the distribution action. Due to the continuous pivoting motion of the guide vanes 64 the chopped straw is deflected successively back and forth, so that with a sufficiently high pivoting frequency a uniform distribution of the harvested crop on the ground is attained even with moist or green and heavy straw, thereby avoiding an undesirable swath of chopped straw.

The elongated hole 86 makes it possible to fasten the pin 88 at differing distances from the axis of rotation of the element 84. By adjusting the distance from the axis of rotation the amplitude of the back and forth pivoting movement of the guide vanes 64 can be adjusted. The pivoting frequency is controlled by the rotational speed of the drive 78 and is preferably also variable. As illustrated in FIG. 2, the guide vanes 64 can operate synchronously. It is also conceivable that the struts 92 to the left and the right of the central wall 98 can be driven in opposite phases. That is in opposite directions, which can be attained by two pins 88 that are located diametrically opposite to each other on the element 84, each of which drives a connecting rod 90 and a strut 92. The advantage to this design lies in the fact that even with higher pivoting frequencies no detrimental vibration of the distributing device 62 need be feared.

FIG. 3 shows a second embodiment of a distributing device according to the invention. Here the elements that correspond to elements of FIG. 2 are identified by the same numerical designators. In this embodiment, the connecting element 94 can be disconnected from the struts 92, so that each of the guide vanes 64 can be coupled to the connecting rod 90 in a selected position. For this purpose the struts 92 can be fastened (inserted) selectively at various places 93 to the clamp-shaped connecting element 94 which are arranged above the top sheet 60 and supported in bearings, on the axes 80. Thereby the individual guide vanes 64 operate at varying possible different pivot angles and amplitudes, and thereby differing distribution widths. The clamp-shaped connecting elements 94 rest on sliding rails 102 which are attached to the rear edge of the upper side of the top sheet 60.

A mechanism to control the back and forth motion of the guide vanes 64 in response to wind and the inclination of the ground, and thereby a corresponding distribution of the conveyed crop is illustrated in FIGS. 3 and 4. The rotating disk-shaped element 84 including the drive 78 and the shaft 82 are fastened to a mount 97 that is pivotally mounted about an axis of rotation 101 on the top sheet 60. The mount 97 is configured as a two arm lever. The element 84 is mounted on the first arm 106. An eye 110 is mounted on the second arm 108 which is coupled to a connecting component 100 that in turn is coupled to a regulating motor 99. The regulating motor 99 is driven electrically (or hydraulically or pneumatically) and is controlled either manually or by means of a wind direction sensor 112 and/or a ground inclination sensor 114 corresponding to the wind direction or to the inclination of the ground. It can be configured as a spindle motor and performs a sideways sliding of the connecting component 100. By sliding the connecting component 100, the position of the rotating disk-shaped element 84 on the first arm of the mount 97 is changed to the left or the right. In this way the oscillating guide vanes 64 eject the chopped straw to conform to the side wind or the ground inclination conditions.

Having described the preferred embodiment, it will become apparent that various modifications can be made without departing from the scope of the invention as defined in the accompanying claims.

What is claimed is:

1. A distributing device in a chopper arrangement having at least one guide vane for transversely scattering a chopped crop, a drive operatively coupled to the guide vane continuously moves the guide vane back and forth.

2. A distributing device as defined by claim 1 wherein the drive pivots the guide vane back and forth about a vertical axis.

3. A distributing device as defined by claim 2 wherein the chopper arrangement has several guide vanes that are arranged transversely alongside each other and are connected to the drive.

4. A distributing device as defined by claim 3 wherein the guide vanes are pivoted back and forth by an element which is rotated by the drive.

5. A distributing device as defined by claim 4 further comprising a connecting rod that extends between the guide vanes and a pin located in a hole in the element.

6. A distributing device as defined by claim 5 wherein the hole of the element is a radially extending elongated hole and the pin can be locked in the elongated hole in various radial positions.

7. A distributing device as defined by claim 6 wherein the guide vanes are connected to a strut which in turn is connected to the connecting rod, the guide vanes can be locked to the strut so that the guide vanes can be repositioned.

8. A distributing device as defined by claim 7 wherein the guide vanes are connected over a connecting element with the strut, the distributing device is provided with a housing having a top wall with an upper surface, the guide vanes are in sliding contact with the upper surface of the top wall.

9. A distributing device as defined by claim 8 wherein each of the guide vanes is provided with a diffusor.

10. A distributing device as defined by claim 4 wherein the element is rotatively mounted to a mount forming a lever arm that can be selectively pivoted by a regulating motor.

11. A distributing device as defined by claim 10 wherein the regulating motor pivots the mount as a function of the wind direction.

12. A distributing device as defined by claim 10 wherein the regulating motor pivots the mount as a function of the inclination of the ground.

13. An agricultural combine comprising:
a frame
a threshing assembly for separating grain from straw;
a separating assembly further separating grain from straw;
a straw chopper connected to the frame downstream from the separating assembly for receiving straw therefrom, the straw chopper chopping the straw into smaller pieces, the chopper having guide vanes for distributing the smaller pieces, the guide vanes being coupled to a drive that continuously moves the guide vanes transversely back and forth.

14. An agricultural combine as defined by claim 13 wherein the guide vanes are pivoted back and forth by an element that is rotated by the drive, the element is rotatively mounted to a mount forming a lever arm that can be selectively pivoted by a regulating motor, the regulating motor selectively pivots the mount as a function of the wind direction.

15. An agricultural combine as defined by claim 13 wherein the guide vanes are pivoted back and forth by an element that is rotated by the drive, the element is rotatively mounted to a mount forming a lever arm that can be selectively pivoted by a regulating motor, the regulating motor selectively pivots the mount as a function of the inclination of the ground.

16. A method of distributing processed crop material from a combine back to a field, the method comprising the following steps:

chopping the processed crop material received from a separating assembly on the combine with a straw chopper creating chopped crop material;

guiding and distributing the chopped crop material from the straw chopper with guide vanes; and continuously moving the guide vanes transversely back and forth to evenly distribute the chopped crop material.

* * * * *